United States Patent [19]
Tsuda et al.

[11] Patent Number: 4,760,603
[45] Date of Patent: Jul. 26, 1988

[54] METHOD AND APPARATUS OF RECOGNITION

[75] Inventors: Ichiro Tsuda; Hiroshi Shimizu, both of Tokyo; Kenichi Hibino, Kanagawa, all of Japan

[73] Assignee: Research Development Corporation of Japan, Tokyo, Japan

[21] Appl. No.: 801,991

[22] Filed: Nov. 26, 1985

[30] Foreign Application Priority Data

Nov. 26, 1984 [JP] Japan .................. 59-249249
Nov. 26, 1984 [JP] Japan .................. 59-249250

[51] Int. Cl.⁴ .............................................. G06K 9/00
[52] U.S. Cl. ...................................... 382/14; 382/17; 382/25; 382/29
[58] Field of Search .................. 382/25, 17, 29, 64, 382/14

[56] References Cited

U.S. PATENT DOCUMENTS

| | | | |
|---|---|---|---|
| 3,271,761 | 9/1966 | Kuang-Chi Hu | 382/25 |
| 3,332,064 | 7/1967 | Marsh | 382/17 |
| 3,482,211 | 12/1969 | De Claris et al. | 382/17 |
| 3,509,534 | 4/1970 | Partin | 382/17 |
| 4,115,803 | 9/1978 | Morton | 382/25 |

Primary Examiner—Leo H. Boudreau
Attorney, Agent, or Firm—Jones, Tullar & Cooper

[57] ABSTRACT

A method for recognizing a given pattern in a known system of pattern which contains a group of known patterns corresponding to different reference oscillation frequencies in one-to-one relation. First, a given pattern is represented in terms of a physical system capable of causing a nonlinear oscillation at a frequency corresponding to the conception inherent to the given object. The physical system is then oscillated so that the oscillation of the physical system will converge at one frequency under entrainment effect, and the converged frequency is compared with the reference oscillation frequencies of known patterns for identification of the given pattern.

28 Claims, 10 Drawing Sheets

BIPED (HUMAN)

$\bar{N} = 3.483$

BIPED
(HUMAN)

$\bar{N} = 3.483$

BIPED
(APE)

$\bar{N} = 3.484$

QUADRUPED $\bar{N} = 3.7$

BIRD $\bar{N} = 2.8$

FIGURE 7A  FIGURE 7B  FIGURE 7C
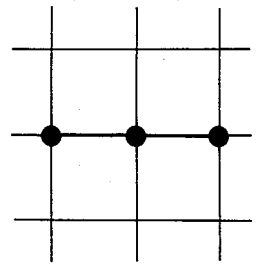 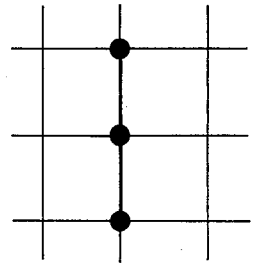 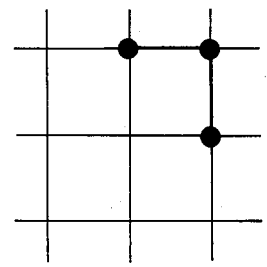
FIGURE 8A  FIGURE 8B  FIGURE 8C
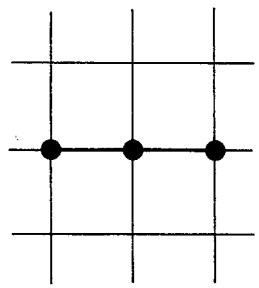 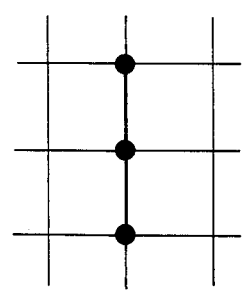 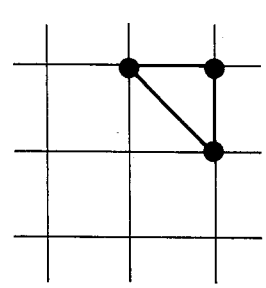

FIGURE 9
| INPUT PATTERN | OUTPUT FREQUENCY (RADIAN/SECOND) |
|---|---|
|  | $6.00 \times 10^5$ |
|  | $6.10 \times 10^5$ |
| 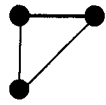 | $6.30 \times 10^5$ |
| 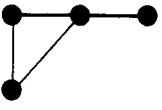 | $6.34 \times 10^5$ |
|  | $6.38 \times 10^5$ |
| 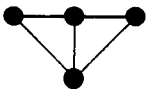 | $6.45 \times 10^5$ |
| 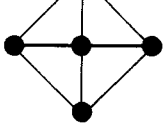 | $6.68 \times 10^5$ |

METHOD AND APPARATUS OF RECOGNITION

BACKGROUND OF THE INVENTION

1. Field of the Invention

The present invention relates to novel recognition method and apparatus, and more specifically to method and apparatus for recognizing patterns such as figures, letters, etc. on the basis of a novel judgment operation.

2. Description of Related Art

Heretofore, mechanical or electrical recognition apparatuses have been constructed such that its judgment is made on the basis of coincidence in numerical values of physical amounts such as lengths, electric currents, electric voltages, etc., or in accordance with the large-and-small relation in those numerical values. For example, computers are founded on a binary notation, which can be realized by ON and OFF of electric currents. Because of this fundamental restriction, the computers cannot carry out an operation similar to a thinking process, particularly judgment process of a human being. In addition, the computers cannot execute the pattern recognition, unless patterns that essentially is of an analog amount are converted into a digital amount.

Here, turning to the recognition of a human being, it is based on judgment for identity: $A = A$ (or $A'$) where $A$ and $A'$ are representative of conceptions. Therefore, this judgment for identity is not the same as that can be obtained from simple comparison of physical values as in the conventional mechanical and electrical recognition apparatuses. In the thinking process of a human being, for example, dogs, horses and cattle are judged to be the same in the category "mammalia", and men and women are the same in the category "humankind". Namely, the recognition of a human being can can be said to be categorization of objects to be recognized. Specifically, the decision of identity is performed at various levels of categories, so that an object to be recognized can be identified in the system of known conceptions. At the same time, a property inherent to an object itself to be recognized can be known.

On the other hand, the conventional mechanical and electrical recognition apparatus cannot perform the above mentioned conception identity judgment. Briefly, in the conventional pattern recognition, a plurality of characters are extracted from a given pattern such as a letter and a figure by means of complicated procedures, and then compared with a group of characters extracted from reference patterns previously prepared, so that the distances between the given pattern and the reference patterns are calculated. Namely, only a simple measurement of one absolute amount is carried out.

In addition, in the conventional pattern recognition, even if a given pattern should be deemed to be the same as one reference pattern, if the given pattern is different in position, angular direction or scale from the reference pattern, the given pattern is often judged to be different from the reference pattern. In other words, a proper recognition is greatly restricted by the position, the angular direction and the scale. In this connection, as one means enabling a proper recognition irrespectively of variation in the position and the angular direction, it is considered to parallel-shift or rotate the given pattern. However, a processing for such a shift or rotation will require a large amount of computations because the characters of the given pattern is derived by means of digital computation.

SUMMARY OF THE INVENTION

Accordingly, it is one object of the present invention to provide novel recognition method and apparatus which are free from the above mentioned drawbacks of the conventional recognition methods and apparatuses.

Another object of the present invention is to provide recognition method and apparatus which can judge identity of an object to be recognized, at various levels of categories.

Still another object of the present invention is to provide pattern recognition method and apparatus which can recognize a given pattern irrespectively of the position and the angular direction of the given pattern and without requiring a complicated processing.

Namely, the above and other objects of the present invention are accomplished by a method in accordance with one aspect of the present invention for recognizing a given object in a known system of conception which contains a group of known conceptions corresponding to different nonlinear oscillatory systems in one-to-one relation. This method comprises the steps of representing an given object in terms of a physical system capable of causing a nonlinear oscillation at a frequency corresponding to the conception inherent to the given object, coupling the physical system to one oscillatory system selected among the nonlinear oscillatory systems, and discriminating whether or not an entrainment occurs between the physical system and the selected oscillatory system, thereby judging the identity between the conception inherent to the given object and the known conception indicated by the selected oscillatory system.

Here, it should be understood that the "entrainment" is different from simple resonance. When there are coupled two nonlinear oscillating systems which oscillate at frequencies different from each other but close to each other, after a suitable time has elapsed, the two oscillating systems become to oscillate at the same frequency different from each of the two original oscillating frequencies. This phenomenon is called "entrainment", and discussed in detail in A. H. Nayfeh and D. T. Mook "Nonlinear Oscillations", John Wiley & Sons 1979. The term "entrainment" is used in the specification to mean the above phenomenon.

Further, in accordance with a second aspect of the present invention, there is provided a method for recognizing a given object in a known system of conception which contains a group of known conceptions corresponding to different reference oscillation frequencies in one-to-one relation, comprising the steps of representing an given object in terms of a physical system capable of causing a nonlinear oscillation at a frequency corresponding to the conception inherent to the given object, selecting one known conception from the known system of conception, driving the physical system at a reference oscillation frequency corresponding to the one selected known conception, and discriminating whether or not an entrainment occurs in the physical system thereby judging the identity between the conception inherent to the given object and the one selected known conception.

Specifically, the group of known conceptions includes a plurality of independent conceptions each having one oscillation frequency which never causes entrainment with an oscillation at each of frequencies corresponding to the other independent conceptions, a plurality of general conceptions each involving at least one independent conception and each having a oscillation frequency which can cause entrainment with the oscillations at respective frequencies corresponding to all the independent conceptions involved in that general conception, and a plurality of specific conceptions each involved in one of the independent conceptions and each having a oscillation frequency which can cause entrainment with the oscillation at the frequency corresponding to the independent conception involving that specific conception.

In the case of categorizing the given object, the physical system is first driven at frequencies corresponding to the general conceptions so as to select one general conception which has caused the entrainment. Then, the physical system is driven at frequencies corresponding to independent conceptions involved in the selected general conception so as to select one independent conception which has caused the entrainment. Further, the physical system is driven at frequencies corresponding to specific conceptions involved in the selected independent conception, thereby determining a specific conception which has caused the entrainment.

In the above categorizing process, when the oscillation frequency of the physical system is coincident with none of the frequencies respectively corresponding to all the conceptions involved in the known system of conception, the conception inherent to the given object and corresponding to the oscillation frequency of the physical system is added as a new conception into the known system of conception.

In the above two recognition methods in accordance with the present invention, the decision of identity is made based on whether or not the entrainment occurs. This entrainment will occur or not occur irrespectively of the position and the angular direction. Therefore, if a given object such as a pattern, analog value, color, etc. is represented by one physical system capable of causing an oscillation at a frequency corresponding to the feature of the given object, the identity of feature can be determined on the basis of whether or not the entrainment occurs between the physical system and the reference nonlinear oscillator or the oscillation of the reference frequency, without influence of the position and direction of the given object.

In a third aspect of the present invention, there is also provided a method for recognizing a given object in a known system of conception which contains a group of known conceptions corresponding to different reference oscillation frequencies in one-to-one relation, comprising the steps of representing an given object in terms of a physical system capable of causing a nonlinear oscillation at a frequency corresponding to the conception inherent to the given object, oscillating the physical system so that the oscillation of the physical system will converge at one frequency under entrainment effect, and comparing the converged frequency with the reference oscillation frequencies for identification of the given object.

In this case, the group of known conceptions can include a plurality of independent conceptions, a plurality of general conceptions and a plurality of specific conceptions, similar to those in the method in accordance with the second aspect of the present invention. The comparison of the converged frequency with the reference oscillation frequencies is preferably performed by comparing the converged frequency with the oscillation frequencies of the general conceptions so as to select one general conception having a minimum oscillation frequency difference from the converged frequency, comparing the converged frequency with the oscillation frequencies of the independent conceptions involved in the selected general conception so as to select one independent conception having a minimum oscillation frequency difference from the converged frequency, and comparing the converged frequency with the oscillation frequencies of the specific conceptions involved in the selected independent conception so as to select one specific conception having a minimum oscillation frequency difference from the converged frequency, whereby the given object is categorized.

Specifically, the representation of the given object in terms of the physical system is performed by preparing a plurality of nonlinear oscillating elements located in the form of a matrix, converting the given object to a corresponding simplified pattern, and selectively mutually connecting the nonlinear oscillating elements in accordance with the simplified pattern, so that the mutually connected nonlinear oscillating elements of the matrix have as a whole an oscillation frequency inherent only to the simplified pattern.

Preferably, each of the nonlinear oscillating elements is a van der Pol oscillator. In addition, the given object is a two-dimensional pattern, and the two-dimensional pattern is detected by means of a two-dimensional image sensor and the obtained image is converted into a dot pattern consisting of a plurality of dots each corresponding to one nonlinear oscillating element of the matrix.

In the above recognition method, the identity is discriminated on the basis of whether or not the oscillation frequency obtained as the result of the entrainment effect is equal or close to the reference frequencies. As mentioned above, since the entrainment will occur or not occur without respect to the position and the angular direction of the nonlinear oscillating physical system, a given object such as a pattern can be recognized regardless of its position and direction, if the given object is substituted by a nonlinear oscillating physical system.

Furthermore, in accordance with a fourth aspect of the present invention, there is provided a method for recognizing a given pattern, comprising the steps of calculating in respect of a given pattern an index $\overline{N}$ which is represented by the ratio of the full length of the contour of a pattern and the full length of the "convex envelope" of the same pattern, comparing the calculated index $\overline{N}$ with stored indexes $\overline{N}$ of know patterns, and categorizing the given pattern in accordance with known patterns having indexes $\overline{N}$ falling in a predetermined difference extent $\Delta\Omega$ from the index $\overline{N}$ of the given pattern.

The above index $\overline{N}$ takes different values inherent to various shapes in one-to-one relation, as will be explained in detail hereinafter. Therefore, if the index $\overline{N}$ is derived in respect of a given pattern and compared with reference indexes $\overline{N}$ corresponding to the known patterns, the given pattern can be identified. In addition, if the comparison between the index $\overline{N}$ of the given pattern and the reference indexes $\overline{N}$ is performed at various significant digits, the given pattern can be recognized at different category levels.

In a fifth aspect of the present invention, there is provided an apparatus for recognizing a given object in a known system of conception which contains a group of known conceptions corresponding to different reference oscillation frequencies in one-to-one relation, comprising means for detecting a given object and forming a physical system capable of causing a nonlinear oscillation at a frequency corresponding to the conception inherent to the given object, means for oscillating the physical system so that the oscillation of the physical system will converge at one frequency under entrainment effect, and means for collating the converged frequency with the stored reference oscillation frequencies corresponding to the known conceptions.

In one embodiment of the above apparatus, the physical system forming means includes a plurality of nonlinear oscillating elements located in the form of a matrix having a plurality of rows and a plurality of columns, means for producing a two-dimensional dot pattern from the given object, the dot pattern consisting of a plurality of dots each corresponding to one nonlinear oscillating elements of the matrix, means for mutually connecting the nonlinear oscillating elements of the matrix corresponding to the respective dots of the produced dot pattern so that the mutually connected nonlinear oscillating elements have as a whole one oscillation frequency inherent only to the produced dot pattern.

Furthermore, in accordance with a sixth aspect of the present invention, there is also provided an apparatus for recognizing a given pattern in a known system of pattern which contains a group of known patterns corresponding to different reference oscillation frequencies in one-to-one relation, comprising means for storing reference frequencies corresponding to the known patterns, means for detecting a given pattern so as to produce a two-dimensional simplified dot pattern representative of the given pattern, an oscillator matrix circuit including a plurality of nonlinear oscillating elements arranged in the form of a matrix having a plurality of rows and a plurality of column, means for selectively operating the oscillating elements of the matrix corresponding to the respective dots of the simplified dot pattern in such a manner that each operated oscillating element and all operated oscillating elements adjacent thereto mutually influence their oscillating condition, so that the matrix finally has one oscillating frequency corresponding to the dot pattern, and means for measuring the oscillating frequency and collating the measured oscillating frequency with the stored reference frequencies.

Specifically, the pattern detecting means includes a two-dimensional image sensor, and means receiving an image output of the image sensor for producing the dot pattern consisting of a plurality of dots each corresponding to one nonlinear oscillating elements of the oscillator matrix circuit.

In addition, the means for selectively operating the oscillating elements includes means receiving the output of the dot pattern producing means for storing the dot pattern, the storing means having a plurality of memory cells located in the form of a matrix which has the same rows and columns in number as those of the oscillator matrix circuit, and switch means including a plurality of switch cells arranged in the form of a matrix which has the same rows and columns in number as those of the oscillator matrix circuit, each of the switch cells being controlled by the output of a corresponding memory cell in the storing means so as to operate a corresponding oscillating element of the oscillator matrix circuit.

Preferably, each of the nonlinear oscillating elements is a van der Pol oscillator.

Further, the collating means is preferably adapted to calculate the differences between the measured oscillating frequency and the stored reference frequencies so as to specify the reference frequencies having the differences from the measured oscillating frequency within a predetermined extent, whereby the given pattern is categorized.

The above and other objects, features and advantages of the present invention will be apparent from the following description of preferred embodiments of the invention with reference to the accompanying drawings.

BRIEF DESCRIPTION OF THE DRAWINGS

FIGS. 7A to 7C and 8A to 8C show examples of coupling of the oscillator cells, respectively;

FIG. 9 is a table showing the relation between patterns and oscillation frequencies of the oscillator cells coupled in accordance with the patterns;

DESCRIPTION OF THE PREFERRED EMBODIMENTS

Figure 1A:
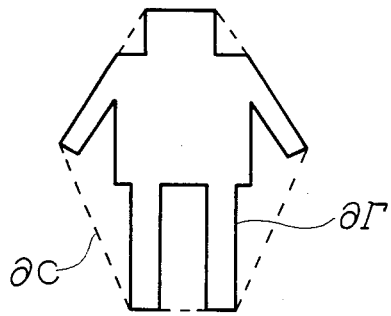
FIGS. 1A, 1B, 1C and 1D illustrate the principle of the pattern recognition in accordance with the present invention.
Figure 1B:
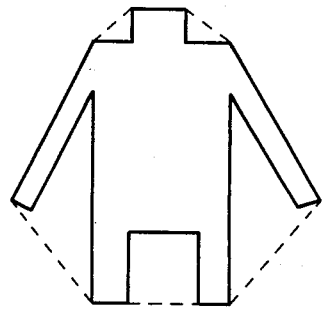
Figure 1C:
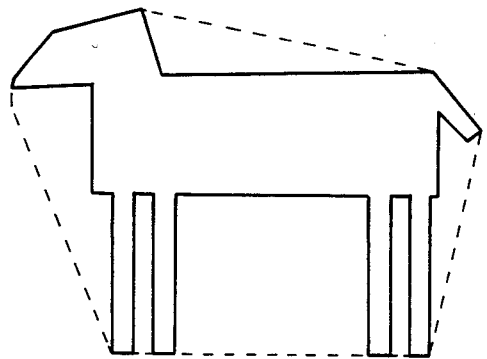
Figure 1D:
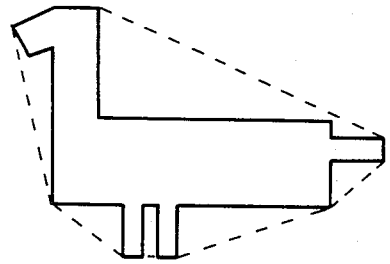

Referring to FIGS. 1A to 1D, there are shown typical simplified patterns of human, ape, quadruped and bird. In respect of the four patterns shown, if the aforementioned index $\overline{N}$, i.e., the ratio of twice the full length $\partial\Gamma$ of the contour of a pattern or shape to the full length $\partial C$ of the "convex envelope" of the same pattern $(2|\partial\Gamma|/|\partial C|)$ is calculated, the values of the index $\overline{N}$ are 3.483, 3.484, 3.7 and 2.8, respectively. Here, the "convex envelope" means an envelope circumscribing the given pattern and having only outwardly directed corners.

As is apparent from comparison of these indexes $\overline{N}$, different patterns will take the indexes N different from one another. In other words, this index N is a value inherent to each of various patterns, and this fact has been confirmed in the research of the inventors.

Now, comparing the four indexes $\overline{N}$ under the condition of two significant digits, namely, under the extent of allowable error or difference $\Delta\Omega < 0.1$, the human and the ape can be said to belong to the same category, for example, "biped", since the difference $\Delta\Omega$ between the $\overline{N}$ of 3,483 for the human and the $\overline{N}$ of 3,484 for the ape is less than 0.1. On the other hand, the differences $\Delta\Omega$ between the indexes $\overline{N}$ for the human, the quadruped and the bird are not less than 0.1, and therefore, it can be said that the human, the quadruped and the bird do not belong to the same category. But, if the comparison is made under the condition that a maximum allowable difference is 0.5, since the differences between the indexes $\overline{N}$ for the human, the ape and the quadruped do not exceed 0.5, they belong to the same category broader than the biped, for example "animal". To the contrary, if comparison is performed under the condition of an allowable difference $\Delta\Omega < 0.0005$, the difference between the indexes $\overline{N}$ for the human and the ape is greater than 0.0005, and therefore, the human and the ape can be said to belong to different categories such as "human" and "ape" which are conceptions involved in the biped but narrow than the biped. Namely, if the index $\overline{N}$ of a pattern to be recognized is compared with stored reference indexes $\overline{N}$ under a possible minimum allowable difference $\Delta\Omega$, there can be known the category of an extremely narrow extent to which the pattern to be recognized belongs, i.e., the name of the pattern.

Thus, the index $\overline{N}$ of a given pattern to be recognized is derived in accordance with the procedures mentioned above, and the obtained index $\overline{N}$ is compared with stored indexes in respect of known patterns under the condition of a suitably predetermined allowable difference $\Delta\Omega$, the category to which the given pattern belongs can be known at a desired category level. In other words, a given pattern can be categorized.

The above mentioned index $\overline{N}$ can be deemed to correspond to the oscillation frequency of cells which constitute a visual cortex of the human brain and which have a nonlinear oscillation characteristics. In other words, the index $\overline{N}$ can be regarded to correspond to the oscillation frequency of nonlinear oscillator elements such as van der Pol oscillator cells described in detail hereinafter.

Therefore, instead of the index $\overline{N}$ which needs measurement of the length $\partial\Gamma$ of the contour of a given pattern and the length $\partial C$ of the convex envelope of the given pattern and calculation of the ratio $2|\partial\Gamma|/|\partial C|$, the oscillation frequency corresponding to the index N is directly obtained in the method described in detail hereinafter.

A plurality of van der Pol oscillator cells are arranged in the form of a matrix having a plurality of rows and a plurality of columns, and each of van der Pol oscillator cells is made to be capable of coupling with van der Pol oscillator cells adjacent thereto. On the other hand, a given pattern to be recognized is converted into a "two-dimensional dot pattern." Then, the oscillator cells corresponding to the respective dots of the obtained dot pattern are selectively excited, and at the same time, each of the exciting oscillator cells are coupled with exciting oscillator cells adjacent thereto. As a result, the excited oscillator cells of the matrix become to oscillate as a whole at one frequency under the so called entrainment effect, which frequency depends only upon the shape of the dot pattern, and corresponds to the above mentioned index $\overline{N}$.

Figure 2:
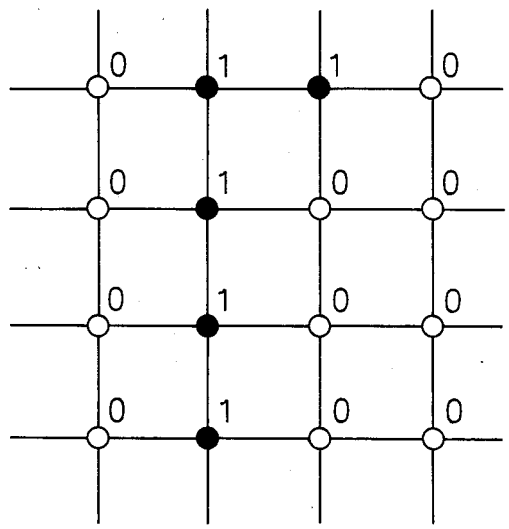
FIG. 2 is a diagram showing an example of the dot pattern prepared from a pattern to be recognized.
Figure 3:
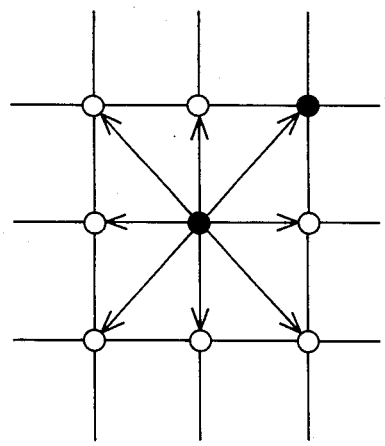
FIG. 3 illustrates the relation between adjacent dots.

Here, the term "two-dimensional dot pattern" means a pattern consisting of dots positioned at respective intersections of a rectangular lattice, as shown in FIG. 2. These dots are represented by one bit data: "1" indicates a black dot and "0" indicates a white dot. Therefore, the two-dimensional dot pattern is a two-dimensional bit pattern. Further, the term "couple" means that the oscillator cells corresponding to the black dots (the bits of "1") in the dot pattern are coupled to oscillator cells adjacent thereto in various directions so that the coupled oscillator cells are mutually subjected to influence in respect of oscillation condition. For example, in the case of a dot pattern shown in FIG. 3, a center black dot has eight peripheral dots adjacent thereto, but, since the black dot is only the upper right dot of the eight peripheral dots, the center dot is coupled with only the upper right dot.

In the present invention, therefore, an unknown object (which is not limited to patterns) is converted into a nonlinear oscillating system which is typified by the above mentioned van der Pol oscillator cell matrix, and then the nonlinear oscillating system is coupled with another nonlinear oscillating system capable of oscillating at a frequency corresponding to one known conception. In this case, the identity between the known conception and the conception inherent to the unknown object can be determined dependently upon whether or not the entrainment occurs between the two systems.

Similarly, an unknown object such as a pattern is converted into a nonlinear oscillating system such as the van der Pol oscillator cell matrix, and then the nonlinear oscillating system is excited at a given frequency inherent to one known conception. If the oscillating system then cause the entrainment, the unknown object can be indicated by the known conception.

Furthermore, an unknown object, for example, an unknown pattern is converted into a nonlinear oscillating system (for example, a van der Pol oscillator cell matrix) and the nonlinear oscillating system is excited so that the nonlinear oscillating system causes to converge its oscillating frequency at one stable frequency for the entrainment effect. Then, the converged frequency is compared with various reference frequencies inherent to known conceptions (known patterns). As a result, if the converged frequency is consistent with one of the reference frequency, the unknown object can be said to be expressed by a known conception corresponding to the consistent reference frequency.

Figure 4:
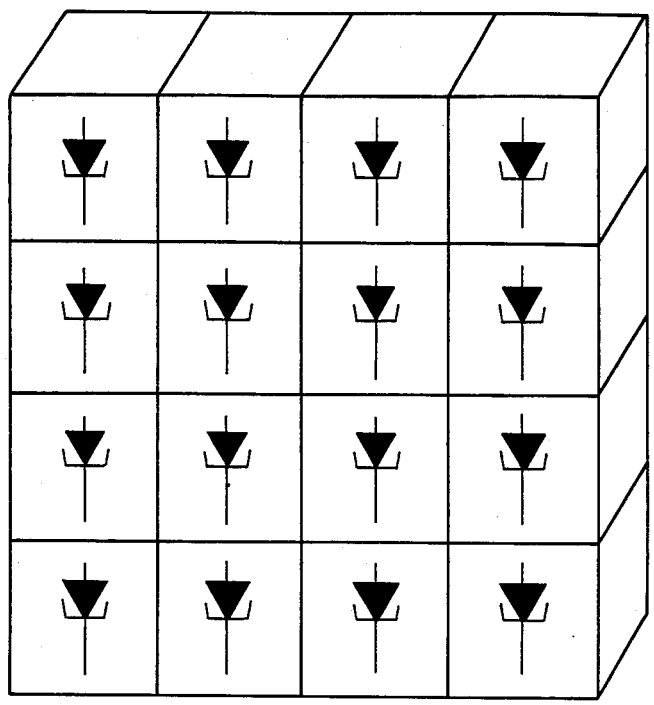
FIG. 4 illustrates an arrangement of oscillator cells in a van der Pol oscillator cell matrix.

For example, a plurality of van der Pol oscillator cells are located in the form of a two-dimensional lattice or a matrix, as shown in FIG. 4. Of the oscillator cell matrix, oscillator cells corresponding to the black dots of a given dot pattern (the "1" bits of a given bit pattern) are selected, and then, each of the selected oscillator cells is excited at a frequency determined on the basis of the number of adjacent black dots (adjacent "1" bits). At the same time, an interaction is given between each couple of adjacent selected oscillator cells, for example through a resistor having a resistance in proportion to the difference of velocity between each couple of adjacent selected oscillator cells. As a result, after about ten periods from excitation of the oscillator cells, the selected oscillator cells become to oscillate at the same frequency by the action of the entrainment effect.

As mentioned above, this oscillating frequency depends only upon the shape of the given pattern. In other words, the oscillating frequency represents the shape of the given pattern. In addition, in the case of the nonlinear oscillator cell matrix as shown in FIG. 4, even if the given pattern is rotated at 90°, 180° or 270°, or inverted or parallel-shifted, the final oscillating frequency never changes.

Furthermore, if a substantial portion of the above mentioned processing is executed by use of analog circuits, the necessary processing can be carried out within the time of 0.1 to 0.2 seconds, irrespectively of increase in the degree of freedom in the pattern recognition which would be given by rotation, parallel shift, etc. of a given pattern. Besides, since a pattern is finally converted into one frequency, when patterns are stored or transferred, necessary memory capacity and channel capacity can be made small.

Next, discussion will be made on nonlinear oscillator cells which constitute a nonlinear oscillator cell matrix capable of causing the entrainment. One typical example of such nonlinear oscillator cells is a van der Pol oscillator cell, as mentioned above. This van der Pol oscillator cell can be defined as having an operational characteristics expressed by the following equation:

$$\frac{d^2x}{dt^2} = a(1 - bx^2)\frac{dx}{dt} - w_i^2 x \quad (1)$$

where x represents a magnitude such as a voltage in an electric circuit and a force in a physical system;
t is time (second);
$w_i$ is an inherent frequency of oscillating system; and
a and b are coefficients.

In the nonlinear oscillating matrix constituted of the van der Pol oscillator cells having the above mentioned characteristics, the inherent frequency $w_i$ of each oscillator cell is determined in accordance with the following equation:

$$w_i^2 = w^2(1 = Cn_i) \quad (2)$$

where w is a standard frequency, for example, $2\pi \times 10^5$ radian/second;
c is a coefficient, for example 0.1; and
$n_i$ is the number of van der Pol oscillator cells which are adjacent to the oscillator cell i excited at the inherent frequency $w_i$ and which correspond to the black dots of the dot pattern (the "1" bits of the bit pattern).

Figure 5:
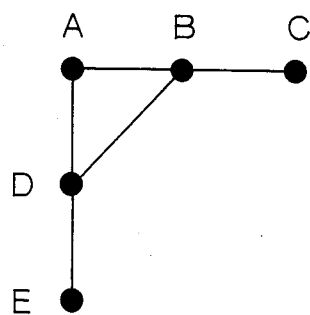
FIG. 5 illustrates coupling of the oscillator cells in accordance with a given pattern.

Further, interaction is given to the respective excited oscillating cells in the following manner. Namely, in the case that two van der Pol cells i and j corresponding to the black dots of the dot pattern (the bits of "1" in the bit pattern) are adjacent to each other, the two cells i and j are connected through a resistor having a resistance $$D\left(\frac{dx_i}{dt} - \frac{dx_j}{dt}\right)$$

corresponding to the difference in velocity between the two cells i and j. Specifically, if five van der Pol cells A, B, C, D and E are coupled as shown in FIG. 5, the van der Pol cells A and B are given the operational characteristics expressed by the following equations:

$$\frac{d^2x_A}{dt^2} = a(1 - bx_A^2)\frac{dx_A}{dt} - w_A^2 x_A + \quad (3)$$

$$D\left(\frac{dx_B}{dt} - \frac{dx_A}{dt}\right) + D\left(\frac{dx_D}{dt} - \frac{dx_A}{dt}\right)$$

-continued $$\frac{d^2x_B}{dt^2} = a(1 - bx_B^2)\frac{dx_B}{dt} - w_B^2 x_B + D\left(\frac{dx_D}{dt} - \frac{dx_B}{dt}\right) +$$

$$D\left(\frac{dx_C}{dt} - \frac{dx_B}{dt}\right) + D\left(\frac{dx_D}{dt} - \frac{dx_B}{dt}\right)$$

In respect of the van der Pol cells C, D and E, their operational characteristics equations can be expressed in the same manner.

In the above equation (3), assuming a=0, the oscillator cells A, B, ... having the output characteristics expressed by $x_A$, $x_B$ ... become linear oscillators. In this case, therefore, unless the condition of $w_A = w_B = \ldots$ is fulfilled, resonance never occur in the coupled oscillator cells. On the other hand, in the case of a≠0, (van der Pol type nonlinear oscillator cell), even if the respective inherent frequencies w are not the same, the entrainment will occur at a frequency between the maximum and minimum frequencies of the inherent frequencies w, so that all the coupled oscillator cells will oscillate at the same frequency in phase. In this connection, it has been known that the entrainment will easily occur by application of the interaction corresponding to the difference of velocity.

Figure 6A:
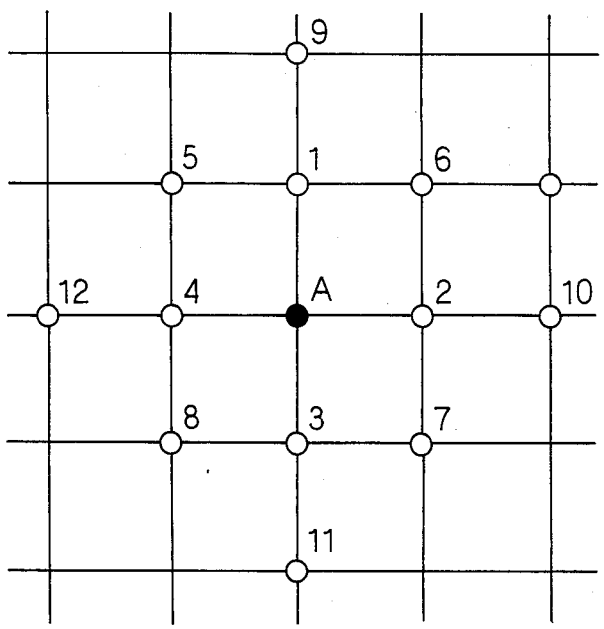
FIGS. 6A and 6B are dot pattern diagrams illustrating the conception of "adjacent dots"

Turning to FIG. 6A, there is shown a dot pattern diagram illustrating the conception of "adjacent dots". Now, assuming that a dot A is a center dot, it is defined that dots 1 to 4 are adjacent to the center dot A in a "tetra-adjacent-direction"; dots 1 to 8 are adjacent to the center dot A in a "octa-adjacent-direction, and dots 1 to 12 in a "dodeca-adjacent-direction". In addition, the "coupled-dot pattern" is defined to be a dot pattern constituted of only a plurality black dots each of which is adjacent to at least one black dot.

Figure 6B:
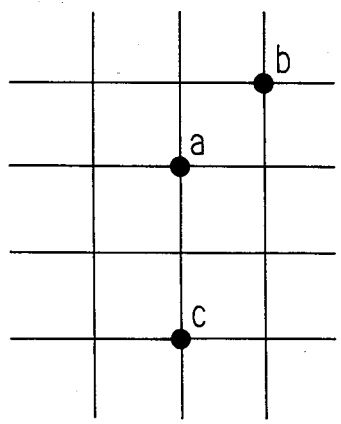

Considering a dot pattern shown in FIG. 6B on the basis of the above definitions, dots a and b do not form a coupled-dot pattern in accordance with the "tetra-adjacent-direction", but constitute a coupled-dot pattern in the "octa-adjacent-direction." Dots a and c do not provide a coupled-dot pattern not only in the tetra-adjacent-direction but also in the octa-adjacent-direction. On the other hand, examining the adjacent direction from the viewpoint of pattern recognition resolution, the resolution is higher in the octa-adjacent-direction than in the tetra-adjacent-direction, and further improved in the dodeca-adjacent-direction.

Totally considering the above mentioned matters, a given pattern can be recognized in the following manner. A given pattern is converted into a dot pattern, which is further converted into a coupled-dot pattern. In a van der Pol oscillator cell matrix, oscillator cells corresponding to the respective dots of the coupled-dot pattern are respectively driven at the inherent frequencies w which are determined in accordance with the equation (2), while adding the interactions between adjacent oscillator cells in accordance with the equation (3). Consequently, one frequency can be obtained from the result of the entrainment effect, and then collated with stored reference frequencies $f_1, f_2, f_3 \ldots$ of known patterns. If the entrainment frequency is the same or very close to one of the reference frequencies, the given pattern is judged to be the same or similar to the known pattern represented by the coincident reference frequency.

As mentioned above, the resolution of the pattern recognition depends upon the number of adjacent directions along which the van der Pol oscillator cells are coupled. For example, reviewing three dot patterns shown in FIGS. 7A, 7B and 7C, these patterns will be deemed to be the same coupled-dot pattern on the basis of the tetra-adjacent-direction. However, considering these patterns in accordance with the octa-adjacent-direction, they are modified as shown in FIGS. 8A, 8B and 8C. Namely, the coupled-dot patterns shown in FIGS. 8A and 8B are the same but can be distinguished from that shown in FIG. 8C.

Turning to FIG. 9, there are shown examples of coupled-dot patterns and corresponding entrainment frequency. In FIG. 9, the solid lines show the coupled relations between black dots which constitute a coupled-dot pattern, i.e., the interacting relations between the van der Pol oscillator cells. The entrainment frequencies shown were obtained under the condition that the various parameters in the equations (2) and (3) are: $a=0.1$, $b=0.1$, $D=0.5$, $w=6.0\times10^5$ radians/second, and $c=0.1$. Incidentally, the values of these parameters are only typical examples, and therefore, these parameters can take different values.

Figure 10:
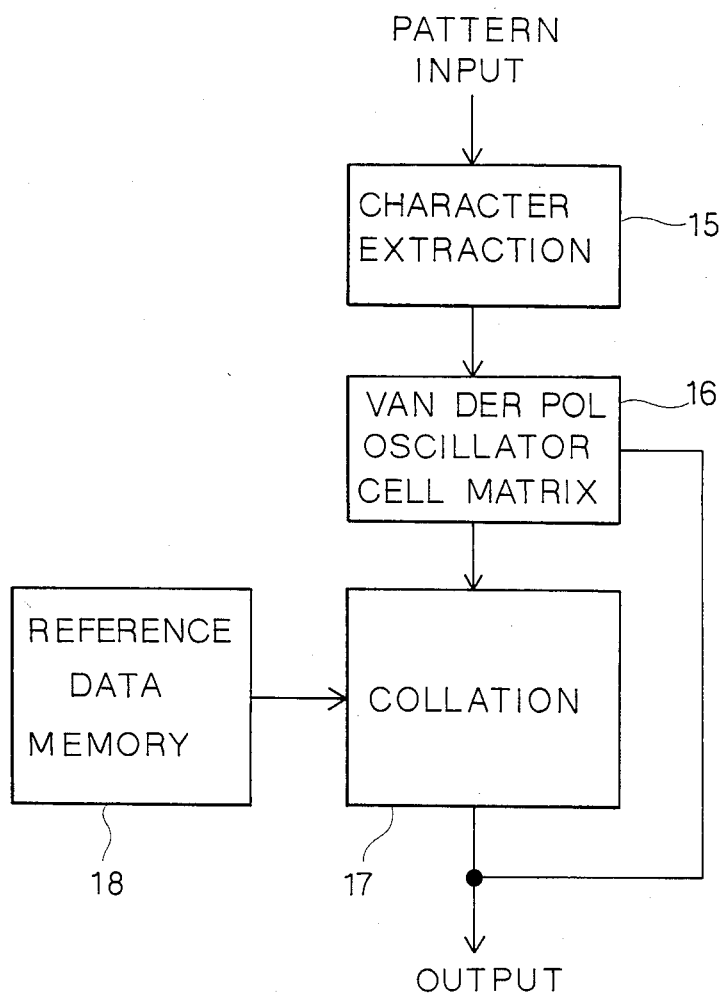
FIG. 10 is a block diagram showing one embodiment of the pattern recognition apparatus in accordance with the present invention.

Referring to FIG. 10, there is shown a block diagram showing an overall structure of the pattern recognizing apparatus in accordance with the present invention. An unknown pattern is image-detected and converted into a dot pattern by a feature extractor 15. For example, the feature extractor 15 includes an image sensor (not shown) which photographs the unknown pattern and generates an analog video signal, which is then fed to a threshold circuit (not shown) where the video signal is converted into binary video signals each of which indicates one dot of the dot pattern.

The output of the feature extractor 15 is connected to a van der Pol oscillator cell matrix 16, which outputs an entrainment frequency $f_a$ to an collator 17 associated with a memory 18 storing reference frequencies $f_1$, $f_2$, $f_3$ . . . of known patterns. Therefore, the entrainment frequency $f_a$ is compared with stored reference frequencies $f_1$, $f_2$, $f_3$ . . . in the collator 17, so that unknown pattern is identified by a known pattern corresponding to one reference frequency which is constituent with the entrainment frequency in a desired allowable difference extent. In this connection, the unknown pattern can be recognized by a category having a desired extent from general conception to a specific name.

Figure 11:
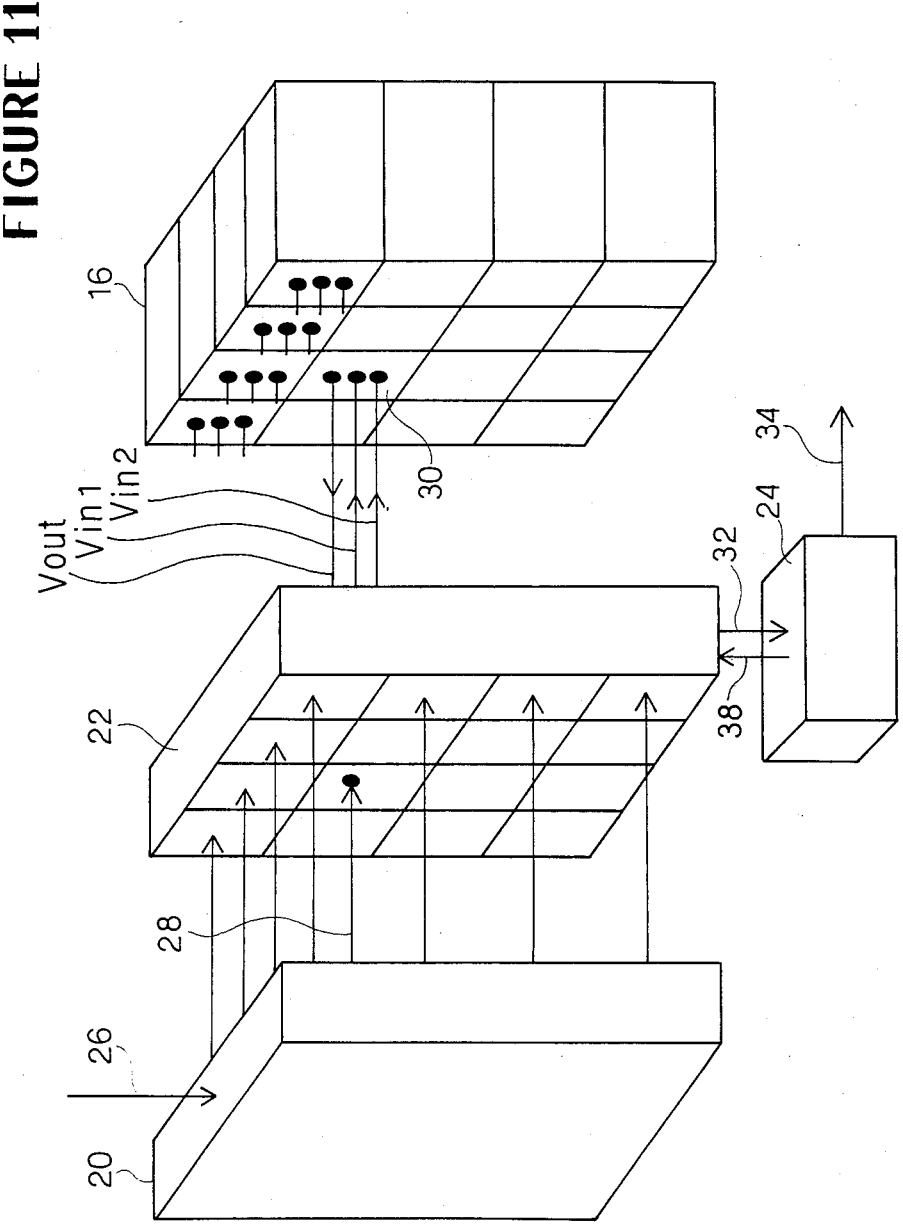
FIG. 11 is a block diagram showing an interface between the dot pattern input and the van der Pol oscillator cell matrix.

Specifically, the binary video signals generated in the feature extractor 15 are fed through a line 26 to a memory cell matrix 20, as shown in FIG. 11. The memory cell matrix 20 is composed of a number of memory cells located in the form of a matrix having a plurality of rows and a plurality of columns sufficient to form a necessary size of dot pattern. The respective binary signals are temporarily stored in the corresponding memory cells of the matrix memory 20, respectively, so that a dot pattern is formed in the memory cell matrix.

The outputs of the respective memory cells are connected through parallel lines 28 to corresponding switch cells of a spatial switch 22, which comprises the same number of switch cells as that of the memory cells. These switch cells are arranged to form a matrix of the same size as that of the memory matrix 20. The spatial switch 22 is associated with a voltage generator and frequency counter 24, and is connected to control a van der Pol oscillator cell matrix 16. This oscillator cell matrix 16 includes van der Pol cells 30 of the same number as that of the switch cells, and these cells 30 are located to form a matrix of the same size as the switch cell matrix of the spatial switch 22. As shown in FIG. 11, each of the van de Pol cells 30 has a non-inverted input $Vin_1$, an inverted input $Vin_2$ and one output Vout, which are connected to the corresponding one switch cell of the spatial switch 22.

Figure 12:
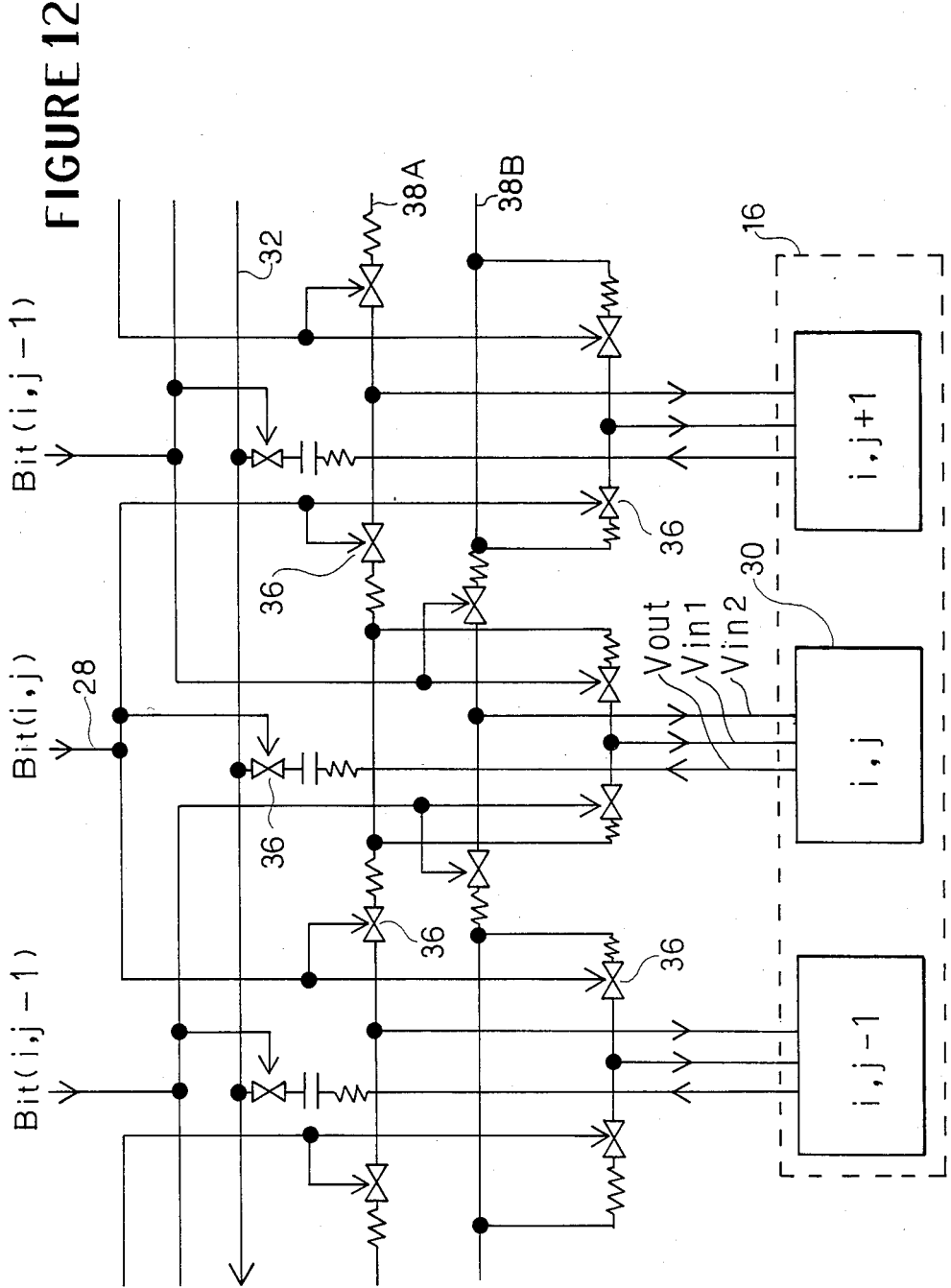
FIG. 12 is a circuit diagram of the spatial switch shown in FIG. 11.

Specifically, the switch cells of the spatial switch 22 includes five analog switch elements 36 in a column direction, as shown in FIG. 12. The five analog switch elements 36 are turned on and off by the output Bit (i, j) of the corresponding memory cell in the memory matrix 20. One of the five analog switch elements 36 is connected at its end through a resistor and a capacitor to the output Vout of the corresponding van der Pol cell (i, j), and also connected at its other end through a line 32 to the voltage generator and frequency counter, 24. Thus, since the outputs Vout of the respective van der Pol cells 30 are connected through the capacitor to the line 32, an AC component of the output Vout is supplied to the voltage generator and frequency counter 24, where the frequency of the AC component is measured and a digital signal representative of the frequency is outputted from a line 34.

The remaining four analog switch elements 36 operate to selectively connect an voltage output line 38 of the voltage generator and frequency counter 24 to the non-inverted and inverted inputs $Vin_1$ and $Vin_2$ of the van der Pol cells 30. Specifically, the voltage output line 38 includes a pair of lines 38A and 38B as shown in FIG. 12, and the four analog switch elements 36 associated to each van der Pol cell (i, j) are connected as shown in FIG. 12, so as to supply feedback voltages $Vin_1$ and $Vin_2$ through the lines 38A and 38B to the adjacent van der Pol cells (i, j−1) and (i, J+1).

These feedback voltages $Vin_1$ and $Vin_2$ are dtermined as follows: Namely, the voltage $Vin_1$ applied to each cell is obtained by multiplying the output voltage Vout of that cell by the total number of adjacent black dots (adjacent bits of "1"). The voltage $Vin_2$ is determined by summing the output voltages Vout of the adjacent cells corresponding to the adjacent black dots (adjacent bits of "1").

For example, if only three van der Pol cells (i, j−1), (i, j) and (i, j+1) correspond to the black dots of the coupled-dot pattern, the feedback voltages $Vin_1$ and $Vin_2$ to the cell (i, j) are expressed as follows:

$$Vin_1 = Vout\ (i, j) \times 2 \qquad (4)$$

$$Vin_2 = Vout\ (i, J-1) + Vout\ (i, j+1) \qquad (5)$$

Figure 13:
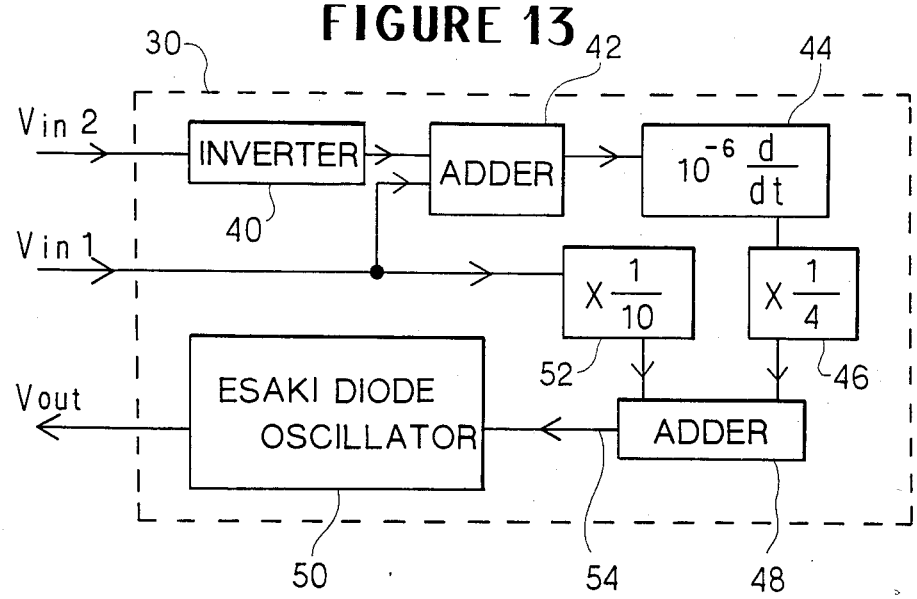
FIG. 13 is a block diagram showing the construction of the van der Pol oscillator cell.

The van der Pol cells 30 receiving such feedback voltages can be constructed as shown in FIG. 13, for example. The feedback voltage $Vin_2$ is applied through an inverter 40 to one input of an adder 42, whose other input is adapted to receive the feedback voltage $Vin_1$. An output of the adder 42 is differentiated by a differentiating circuit 44 and then divided by a divider 46. The output of the divider 46 is connected to one input of another adder 48 as a voltage representing the interaction items in the equation (3). Further, the feedback voltage $Vin_1$ is divided by another divider 52 and supplied to the other input of the adder 48 as a voltage defining a portion of the inherent frequency expressed by the equation (2). The output of the adder 48 is connected through a line 54 to an Esaki diode oscillator 50.

Figure 14:
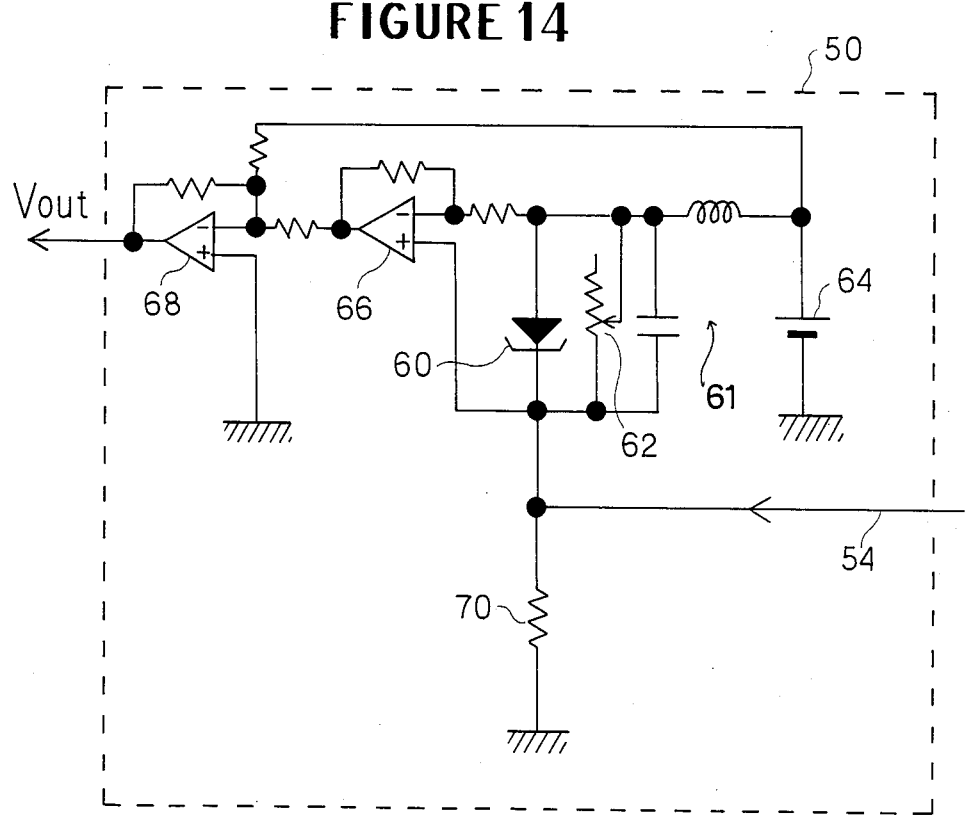
FIG. 14 is a circuit diagram of an Esaki diode oscillating circuit shown in FIG. 13.

The oscillator 50 can be constructed as shown in FIG. 14. Namely, the oscillator 50 includes an Esaki diode 60 having an anode connected to the line 54 and grounded through a feedback resistor 70. A LC circuit 61 and a variable resistor 62 are connected across the diode 60, and a constant DC voltage source 64 is connected to the cathode of the diode 60.

This oscillator 50 is one kind of LC oscillating circuit utilizing the negative resistance characteristics of the Esaki diode 60. Namely, the current flowing through the Esaki diode 60 is approximately expressed by a third order function of the voltage across the diode 60, so that the output voltage of the oscillator using the Esaki diode can be expressed by the equation (1). Specifically, the variable resistor 62 is used to adjust the negative resistance characteristics of the diode 60 so as to ultimately control the magnitude of variation in the output voltage Vout. In other words, the change in the resistance of the variable resistor 62 corresponds to the change of the coefficients a and b in the equation (1).

Now, assuming that the voltage across the diode 60 is Ved and the voltage of the constant DC source 64 is Vc, and also assuming that the resistance of the resistor 70 is zero, the factor x in the equation (1) can be expressed as follows:

$$x = Ved - Vc \qquad (6)$$

Therefore, if the voltage Ved across the diode 60 is inverted by an operational amplifier 66, and added with the voltage Vc at an input of an inverting amplifier 68, the output voltage Vout of the amplifier 68 becomes the voltage expressed by the equation (6).

However, since the diode 60 is biased by the feedback voltage across the resistor 70, this oscillator 50 operates as expressed by the equation (3).

The invention has thus been shown and described with reference to specific embodiments. However, it should be noted that the invention is in no way limited to the details of the illustrated structures but changes and modifications may be made within the scope of the appended claims.

What is claimed is:

1. A method for recognizing a given object in a known system of conception which contains a group of known conceptions corresponding to different nonlinear oscillatory systems in one-to-one relation, comprising the steps of: representing a given object in terms of a physical system capable of causing a nonlinear oscillation at a frequency corresponding to the conception inherent to the given object; coupling the physical system to one oscillatory system selected among the nonlinear oscillatory systems so that the physical system and the oscillatory system will interact with each other; and discriminating whether or not an entrainment occurs between the physical system and the selected oscillatory system as a result of the interaction of nonlinear oscillation, thereby judging the identity between the conception inherent to the given object and the known conception indicated by the selected oscillatory system.

2. A method claimed in claim 1 wherein the representation of the given object in terms of the physical system is performed by preparing a plurality of nonlinear oscillating elements located in the form of a matrix, giving the given object a corresponding simplified pattern, and selectively mutually connecting the nonlinear oscillating elements in accordance with the simplified pattern, so that the mutually connected nonlinear oscillating elements of the matrix have as a whole an oscillation frequency inherent only to the simplified pattern.

3. A method for recognizing a given object in a known system of conception which contains a group of known conceptions corresponding to different oscillation frequencies in one-to-one relation, comprising the steps of: representing a given object in terms of a physical system capable of causing a nonlinear oscillation at a frequency corresponding to the conception inherent to the given object; selecting one known conception from the known system of conception; driving the physical system at an oscillation frequency corresponding to the one selected known conception; and discrimination whether or not an entrainment occurs in the physical system as a result of interaction between the physical system and the oscillation frequency, thereby judging the identity between the conception inherent to the given object and the one selected known conception.

4. A method claimed in claim 3 wherein the group of known conceptions includes a plurality of independent conceptions each having one oscillation frequency which never causes entrainment with an oscillation at each of frequencies corresponding to the other independent conceptions, a plurality of general conceptions each involving at least one independent conception and each having a oscillation frequency which can cause entrainment with the oscillations at respective frequencies corresponding to all the independent conceptions involved in that general conception, and a plurality of specific conceptions each involved in one of the independent conceptions and each having a oscillation frequency which can cause entrainment with the oscillation at the frequency corresponding to the independent conception involving that specific conception.

5. A method claimed in claim 3 wherein when the oscillation frequency of the physical system is coincident with none of the frequencies respectively corresponding to all the conceptions involved in the known system of conception, the conception inherent to the given object and corresponding to the oscillation frequency of the physical system is added as a new conception into the known system of conception.

6. A method claimed in claim 3 wherein the representation of the given object in terms of the physical system is performed by preparing a plurality of nonlinear oscillating elements located in the form of a matrix, converting the given object to a corresponding simplified pattern, and selectively mutually connecting the nonlinear oscillating elements in accordance with the simplified pattern, so that the mutually connected nonlinear oscillating elements of the matrix have as a whole an oscillation frequency inherent only to the simplified pattern.

7. A method for recognizing a given object in a known system of conception which contains a group of known conceptions corresponding to different reference oscillation frequencies in one-to-one relation, comprising the steps of representing a given object in terms of a physical system capable of causing a nonlinear oscillation at a frequency corresponding to the conception inherent to the given object, oscillating the physical system so that the oscillation of the physical system will converge at one frequency under entrainment effect, and comparing the converged frequency with the reference oscillation frequencies for identification of the given object.

8. A method claimed in claim 7 wherein the group of known conceptions includes a plurality of independent conceptions each having one oscillation frequency which never causes entrainment with an oscillation at each of frequencies corresponding to the other independent conceptions, a plurality of general conceptions each involving at least one independent conception and each having a oscillation frequency which can cause entrainment with the oscillations at respective frequencies corresponding to all the independent conceptions involved in that general conception, and a plurality of specific conceptions each involved in one of the independent conceptions and each having a oscillation frequency which can cause entrainment with the oscillation at the frequency corresponding to the independent conception involving that specific conception.

9. A method claimed in claim 7 wherein when the oscillation frequency of the physical system is coincident with none of the frequencies respectively corresponding to all the conceptions involved in the known system of conception, the conception inherent to the given object and corresponding to the oscillation frequency of the physical system is added as a new conception into the known system of conception.

10. A method claimed in claim 7 wherein the representation of the given object in terms of the physical system is performed by preparing a plurality of nonlinear oscillating elements located in the form of a matrix, converting the given object to a corresponding simplified pattern, and selectively mutually connecting the nonlinear oscillating elements in accordance with the simplified pattern, so that the mutually connected nonlinear oscillating elements of the matrix have as a whole an oscillation frequency inherent only to the simplified pattern.

11. A method for recognizing a given pattern, comprising the steps of calculating in respect of a given pattern an index $\overline{N}$ which is represented of the ratio of the full length of the contour of a pattern and the full length of the convex envelope of the same pattern, comparing the calculated index $\overline{N}$ with stored indexes $\overline{N}$ of known patterns, and categorizing the given pattern in accordance with known patterns having indexes $\overline{N}$ falling in a predetermined extent $\Delta\Omega$ from the index $\overline{N}$ of the given pattern.

12. An apparatus for recognizing a given object in a known system of conception which contains a group of known conceptions corresponding to different reference oscillation frequencies in one-to-one relation, comprising means for detecting a given object and forming a physical system capable of causing a nonlinear oscillation at a frequency corresponding to the conception inherent to the given object, means for oscillating the physical system so that the oscillation of the physical system will converge at one frequency under entrainment effect, and means for collating the converged frequency with the stored reference oscillation frequencies corresponding to the known conception.

13. An apparatus for recognizing a given pattern in a known system of pattern which contains a group of known patterns corresponding to different reference oscillation frequencies in one-to-one relation, comprising means for storing reference frequencies corresponding to the known patterns, means for detecting a given pattern so as to produce a two-dimensional simplified dot pattern representative of the given pattern, an oscillator matrix circuit including a plurality of nonlinear oscillating elements arranged in the form of a matrix having a plurality of rows and a plurality of column, means for selectively operating the oscillating elements of the matrix corresponding to the respective dots of the simplified dot pattern in such a manner that each operated oscillating element and all operated oscillating elements adjacent thereto mutually influence their oscillating condition, so that the matrix finally has one oscillating frequency corresponding to the dot pattern, and means for measuring the oscillating frequency and collating the measured oscillating frequency with the stored reference frequencies.

14. An apparatus claimed in claim 13 wherein the pattern detecting means includes a two-dimensional image sensor, and means receiving an image output of the image sensor for producing the dot pattern consisting of a plurality of dots each corresponding to one nonlinear oscillating elements of the oscillator matrix circuit.

15. An apparatus claimed in claim 14 wherein the means for selectively operating the oscillating elements includes means receiving the output of the dot pattern producing means for storing the dot pattern, the storing means having a plurality of memory cells located in the form of a matrix which has the same rows and columns in number as those of the oscillator matrix circuit, and switch means including a plurality of switch cells arranged in the form of a matrix which has the same rows and columns in number as those of the oscillator matrix circuit, each of the switch cells being controlled by the output of a corresponding memory cell in the storing means so as to operate a corresponding oscillating element of the oscillator matrix circuit.

16. An apparatus claimed in claim 15 wherein each of the nonlinear oscillating elements in a van der Pol oscillator.

17. An apparatus claim in claim 13 wherein the collating means is adapted to calculate the differences between the measured oscillating frequency and the stored reference frequencies so as to specify the reference frequencies having the differences within a predetermined extent, whereby the given pattern is categorized.

18. A method for recognizing a given object in a known system of conception which contains a group of known conceptions corresponding to different nonlinear oscillatory systems in one-to-one relation, comprising the steps of: preparing a plurality of van der Pol oscillators located in the forms of a matrix; giving a given object a corresponding simplified pattern; selectively mutually connecting the van der Pol oscillators in accordance with the simplified pattern, so that the mutually connected van der Pol oscillators of the matrix form a physical system having as a whole an oscillation frequency inherent only to the simplified pattern; coupling the physical system to one oscillatory system selected among the nonlinear oscillatory systems so that the physical system and the oscillatory system will interact with each other; and discriminating whether or not an entrainment occurs between the physical system and the selected oscillatory system as a result of the interaction of nonlinear oscillation, thereby judging the identity between the conception inherent to the given object and the known conception indicated by the selected oscillatory system.

19. A method for recognizing a given object in a known system of conception which contains a group of known conceptions corresponding to different oscillation frequencies in one-to-one relation, the group of known conceptions including a plurality of independent conceptions each having one oscillation frequency which never causes entrainment with an oscillation at each of the frequencies corresponding to the other independent conceptions, a plurality of general conceptions each involving at least one independent conception and each having an oscillation frequency which can cause entrainment with the oscillations at respective frequencies corresponding to all the independent conceptions involved in that general conception, and a plurality of specific conceptions each involved in one of the independent conceptions and each having an oscillation frequency which can cause entrainment with the oscillation at the frequency corresponding to the independent conception involving that specific conception, comprising the steps of: representing a given object in terms of a physical system capable of causing a nonlinear oscillation at a frequency corresponding to the conception inherent to the given object; selecting one known conception from the known system of conception; driving the physical system at an oscillation frequency corresponding to the one selected known conception; and discriminating whether or not an entrainment occurs in the physical system as a result of interaction between the physical system and the oscillation frequency, thereby judging the identity between the conception inherent to the given object and the one selected known conception, characterized in that the steps of driving the physical system and discriminating whether the entrainment occurs include the substeps of driving the physical system at frequencies corresponding to the general conceptions, selecting one general conception which has caused the entrainment, driving the physical system at frequencies corresponding to independent conceptions involved in the selected general conception, selecting one independent conception which has caused the entrainment, driving the physical system at frequencies corresponding to specific conceptions involved in the selected independent conception, and determining a specific conception which has caused the entrainment, whereby the given object is categorized.

20. A method for recognizing a given object in a known system of conception which contains a group of known conceptions corresponding to different oscillation frequencies in one-to-one relation, comprising the step of: preparing a plurality of van der Pol oscillators located in the form of a matrix; converting a given object into a corresponding simplified pattern; selectively mutually connecting the van der Pol oscillators in accordance with the simplified pattern, so that the mutually connected van der Pol oscillators of the matrix form a physical system having as a whole an oscillation frequency inherent only to the simplified pattern; driving the physical system at an oscillation frequency corresponding to the one selected known conception; and discriminating whether or not an entrainment occurs in the physical system as a result of interaction between the physical system and the oscillation frequency, thereby judging the identity between the conception inherent to the given object and the one selected known conception.

21. A method claimed in claim 20 wherein the given object is a two-dimensional pattern, and wherein the conversion of the given object into the simplified pattern is realized by detecting the two-dimensional pattern by means of a two-dimensional image sensor and simplifying the obtained image into a dot pattern consisting of a plurality of dots each corresponding to one van der Pol oscillator of the matrix.

22. A method claimed in claim 21 wherein the simplification of the obtained image is performed by extracting a contour from the obtained image.

23. A method for recognizing a given object in a known system of conception which contains a group of known conceptions corresponding to different reference oscillation frequencies in one-to-one relation, the group of known conceptions including a plurality of independent conceptions each having one oscillation frequency which never causes entrainment with an oscillation at each of the frequencies corresponding to the other independent conceptions, a plurality of general conceptions each involving at least one independent conception and each having an oscillation frequency which can cause entrainment with the oscillations at respective frequencies corresponding to all the independent conceptions involved in that general conception, and a plurality of specific conceptions each involved in one of the independent conceptions and each having an oscillation frequency which can cause entrainment with the oscillation at the frequency corresponding to the independent conception involving that specific conception, comprising the steps of: representing a given object in terms of physical system capable of causing a nonlinear oscillation at a frequency corresponding to the conception inherent to the given object; oscillating the physical system so that the oscillation of the physical system will converge at one frequency under entrainment effect; and comparing the converged frequency with the reference oscillation frequencies for identification of the given object, characterized in that the comparison of the converged frequency with the reference oscillation frequencies is performed by comparing the converged frequency with the oscillation frequencies of the general conceptions so as to select one general conception having a minimum oscillation frequency difference from the converged frequency, comparing the converged frequency with the oscillation frequencies of the independent conceptions involved in the selected general conception so as to select one independent conception having a minimum oscillation frequency difference from the converged frequency, and comparing the converged frequency with the oscillation frequencies of the specific conceptions involved in the selected independent conception so as to select one specific conception having a minimum oscillation frequency difference from the converged frequency, whereby the given object is categorized.

24. A method for recognizing a given object in a known system of conception which contains a group of known conceptions corresponding to different reference oscillation frequencies in one-to-one relation, comprising the steps of: preparing a plurality of van der Pol oscillators located in the form of a matrix; converting a given object into a corresponding simplified pattern; selectively mutually connecting the van der Pol oscillators in accordance with the simplified pattern, so that the mutually connected van der Pol oscillators of the matrix form a physical system having as a whole an oscillation frequency inherent only to the simplified pattern, oscillating the physical system so that the oscillation of the physical system will converge at one frequency under entrainment effect; and comparing the converged frequency with the reference oscillation frequencies for identification of the given object.

25. A method claimed in claim 10 wherein the given object is a two-dimensional pattern, and wherein the conversion of the given object into the simplified pattern is realized by detecting the two-dimensional pattern by means of a two-dimensional image sensor and simplifying the obtained image into a dot pattern consisting of a plurality of dots each corresponding to one nonlinear oscillating element of the matrix.

26. A method claimed in claim 25 wherein the simplification of the obtained image is performed by extracting a contour from the obtained image.

27. An apparatus for recognizing a given object in a known system of conception which contains a group of known conceptions corresponding to different reference oscillation frequencies in one-to-one relation, comprising: means for detecting a given object and forming a physical system capable of causing a nonlinear oscillation at a frequency corresponding to the conception inherent to the given object; means for oscillating the physical system so that the oscillation of the physical system will converge at one frequency under entrainment effect; means for collating the converged frequency with the stored reference oscillation frequencies corresponding to the known conception, the above mentioned physical system forming means including a plurality of nonlinear oscillating elements located in the form of a matrix having a plurality of rows and a plurality of columns; means for producing a two-dimensional dot pattern from the given object, the dot pattern consisting of a plurality of dots each corresponding to one nonlinear oscillating element of the matrix; and means for mutually connecting the nonlinear oscillating elements of the matrix corresponding to the respective dots so that the mutually connected nonlinear oscillating elements has as a whole one oscillation frequency inherent only to the produced dot pattern.

28. An apparatus claimed in claim 27 wherein each of the nonlinear oscillating elements in the matrix is a van der Pol oscillator.

* * * * *